Patented Sept. 23, 1952

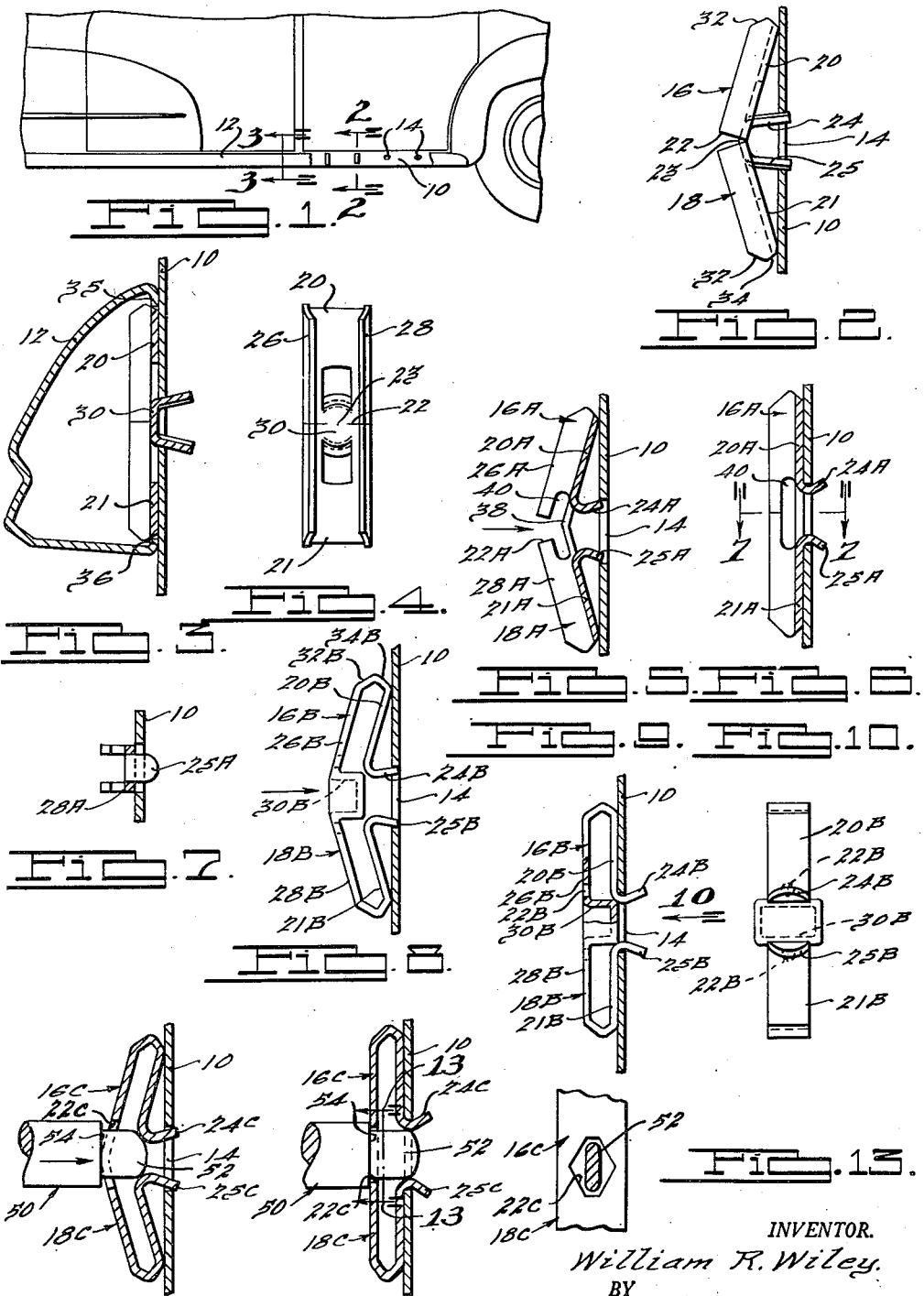

2,611,166

UNITED STATES PATENT OFFICE 2,611,166

DEFORMABLE SHEET METAL FASTENING CLIP

William R. Wiley, Phoenix, Ariz.

Application March 16, 1948, Serial No. 15,105

1 Claim. (Cl. 24—73)

The present invention relates to clip-type fastening devices, particularly adapted for securing desired objects such as decorative or accessory attachments to sheet metal panels or other supporting means formed of relatively thin material. To typify, but by no means to delimit, the fields of utility of my invention, I will herein consider the problem of securing ornamental beading or so-called trim molding to automobile bodies in a rapid but secure and inexpensive manner suited to large scale production. It will be apparent, however, that the principles of the invention are readily applicable to other uses.

An important object of the invention is to provide an improved securing clip of the indicated character which may be quickly and easily attached and which provides a secure fastening.

Another important object is to provide an improved clip of the indicated character which is adapted to be supported in a single hole formed in the supporting body, and which incorporates novel means for substantially closing the hole in the body. An advantage of the improved hole plugging feature is that water is prevented from finding its way through the supporting body panel by way of the holes in which the supporting clips are mounted.

Another object of the invention is to provide such a supporting clip having a deformable head structure and which may be fastened in place simply by deforming the head structure as by striking the same with a hammer or mallet. The head structure is so interrelated with holding portions that are movable with respect to one another in response to such deformation of the head that the holding portions may be caused to enter an appropriately positioned and dimensioned opening in the supporting body and to spread out behind adjacent parts of the supporting body so as to provide a positive interlock and firmly secure the fastening clip thereto, all in response to striking the head a single blow, or pushing it in by the exerting of suitable pressure thereupon.

Other objects and advantages will be apparent upon consideration of the present disclosure in its entirety.

In the drawings,

Figure 1 is a fragmentary side elevational view of an automobile body, showing a length of trim molding secured by means of improved fastening clips constructed in accordance with the present invention, a part of the molding being broken away;

Fig. 2 is a sectional elevational view upon a larger scale taken substantially on the line 2—2 of Fig. 1 and looking in the direction of the arrows, the parts being shown prior to deformation of the clip to secure it in position;

Fig. 3 is a similar sectional elevational view showing the clip locked in place and the molding held thereby, taken on the line 3—3 of Fig. 1;

Fig. 4 is a front elevational view of the clip with molding removed;

Fig. 5 is a view similar to Fig. 2 showing a modified construction;

Fig. 6 is a view similar to Fig. 3 showing the modified clip of Fig. 5 secured in position;

Fig. 7 is a cross sectional view taken substantially on the line 7—7 of Fig. 6 and looking in the direction of the arrows;

Fig. 8 is a view similar to Fig. 2 showing another modified construction;

Fig. 9 is a view similar to Fig. 3 but with the molding omitted, showing the clip of Fig. 8 secured in position;

Fig. 10 is a bottom plan view of the deformed clip of Fig. 9, removed from the supported body;

Fig. 11 is a view similar to Fig. 2 showing another modified construction;

Fig. 12 is a view similar to Fig. 3 but with molding removed, showing the clip of Fig. 11 secured in position; and Fig. 13 is a fragmentary plan view of the fastener of Fig. 11.

Referring now to the drawings, reference character 10 designates an automobile body, which is only fragmentarily illustrated and which is shown to typify a sheet metal support to which an object, shown as a hollow metal molding 12, is to be secured. It will be appreciated that the selection of these particular supporting and supported objects is merely illustrative, although typifying an important field of utility to which the invention is adapted. The body 10 is provided with a series of spaced apertures 14. Due to the fact that the improved clip means of the present invention is adapted to be preliminarily applied to the supporting body rather than to the supported object, the spacing of the apertures 14 is not critical and need not be uniform or accurately maintained.

In the embodiment of the invention shown in Figs. 2–4, the metal is bent to substantially channelled-form to provide an elongated head formed in two upwardly opening channelled sections generally designated 16 and 18, the two sections being partly separated from one another, by a sheared line 22 extending transversely through the side webs 26, 28, and also part way across the central portion 30 of the bottom web. The unsevered portion of the central section of the bottom web serves to join the two head sections 16, 18, and is bent along a transverse hinge line designated 23 lying in the same transverse plane as the sheared line 22, so that the sections 16, 18 are disposed at an angle to one another and the central area 30 of the bottom web forms a hinge and is of angular form, viewed in longitudinal section or side elevation as in Fig. 2.

A pair of tonguelike legs 24, 25 are formed as integral extensions of the central bottom web-hinge portion 30. Legs 24, 25 extend outwardly from a position within and near the apex of the angle included between the two head sections 16, 18 and in the embodiment shown in the drawing, the leg portions are of such length that they extend outwardly a short distance beyond the area included within the angle defined by the sections 16, 18.

As best shown in Fig. 4, the tonguelike legs 24 and 25 are narrower than the bottom web of the channelled head structure, and do not extend the full length of their respective head sections so that each head section also incorporates at its end a bottom web portion 20, 21 connecting the side webs 26, 28. The legs 24, 25 are sheared and formed in such manner as to impart a circular contour to the central combined bottom web and hinge portion 30. The size of portion 30 substantially conforms to the size of the opening 14 in the supporting body with which the fastener is designed to cooperate. The two legs 24, 25 are also oppositely convexly curved to partially circular section, concentrically with respect to the circular area 30, and it will be observed that the two legs 24, 25 extend substantially parallel to one another when the fastener is in its initial condition, that is, with the portion 30 bent about the central transverse hinge line 23 as shown in Fig. 2.

The legs are so tied to the individual head sections 16 and 18 that when the head is flattened so that the sections 16, 18 lie in substantially colinear relation as shown in Fig. 3, the bending of the unsevered portion of the hinge section 30 which results from such flattening of the head, spreads the legs 24, 25 apart so that they extend back of the panel 10 as shown in Fig. 3. The fastener may accordingly be quickly and easily secured in place with respect to the apertured portion of a supporting panel by positioning the ends of the legs 24, 25 in the opening 14, as shown in Fig. 2, and then striking or pushing inwardly the central portion of the head so that the parts assume the positions shown in Fig. 3.

It will also be observed that the circular hinge portion 30 performs the additional function of closing the opening 14, when the fastener is in place, guarding the opening against the entrance of moisture and thereby protecting the interior parts of the body against deterioration.

The outer ends of the side webs 26, 28 of the head sections 16, 18 are generally wedge-shaped, viewed from the side, to provide divergent upper camming portions 32 and convergent lower holding portions 34 adapted to receive and frictionally retain the inbent flanges as 35 of a molding 12 proportioned to fit thereover. The camming portions 32 serve to spread the flanges 35, 36 of the molding, which may be simply forced thereover, the flanges then snapping behind the portions 34 which define angularly overhanging areas adapted to retain the molding as shown in Fig. 3.

In the somewhat modified construction shown in Figs. 5, 6 and 7, wherein analogous parts are designated by like reference characters, distinguished by the addition of a letter "A" to each, the holding leg portions 24A, 25A are also integral down-struck tongues, but are formed as terminal extensions of the inner ends of outer bottom web portions 20A, 21A. The central area of the bottom web is entirely cut away by the formation of the tonguelike legs 24A, 25A, the full width of the bottom flange, rather than narrower than the bottom flange as in the first described embodiment. Accordingly, the opening 14 in the supporting body panel 10 is not covered by the fastener. A central section 38 of the lower part of each of the side webs 26A, 28A is left to constitute a hinge adapted to be bent in the initial forming of the fastener and again in the straightening deformation thereof, when the fastener is applied. The sheared line 22A which separates the head sections 16A and 18A extends approximately half-way down each of the side webs from the top thereof and terminates at a point mid-way of a longitudinal slot as 40 formed in each of the side webs and the length of which substantially corresponds to the spacing between the portions of the legs 24A, 25A, which join the bottom web portions 20A, 21A. Other parts similar to those previously described will require no detailed redescription.

In the further modification shown in Figs. 8, 9 and 10, the head and leg portions are formed of strip stock looped lengthwise in opposite directions, to form the two integral, angularly disposed head sections generally designated 16B, 18B which are also initially arranged at an angle to one another, diverging as they extend outwardly in the same general direction as the centrally disposed holding leg portions 24B, 25B, the general arrangement of these parts being similar to those of the previously described embodiments. The angularly arranged upper portions of the head are respectively designated 26B, 28B, and each of these is substantially parallel to its subjacent bottom web portion 20B, 21B, such bottom head portions being joined to the upper portions by the looped end portions as 32B, 34B, which are bent to define angular camming and holding portions corresponding to the angular portions 32, 34 of the embodiment first described, although bent from the flattened stock, as indicated.

A central area, generally designated 30B, which joins the upper head sections 26B, 28B, is somewhat wider than the remainder of the strip of which the fastener is formed and is downwardly embossed to generally cupped configuration to define a plug-like portion adapted to bear against and substantially close the orifice 14 in the supporting body panel with which the legs 24B, 25B are interengaged when the fastener is attached, in the manner shown in Fig. 9. The plug portion 30B may be, and preferably is, so proportioned as to fit tightly against the adjoining portions of the holding legs and to cover those parts of the opening 14 not closed by the legs. The stock of the head portions 16B, 18B is also preferably weakened adjacent the plug portion 30B, as by the formation of apertures 22B adapted to localize the bending in the areas adjacent such apertures.

In the further modification shown in Figs. 11 and 12, the plug portion 30B of the embodiment last described is omitted and the fastener may accordingly be formed of strip stock of uniform width, whereas the embodiment of Figs. 8, 9 and 10 must be formed of pieces blanked from wider sheets to provide for the widened plug portion. The fastener of Figs. 11 and 12 is otherwise similar to the embodiment of Figs. 8-10, however, and corresponding parts are designated by like reference characters, distinguished by the addition of the letter "C" to each, and will require no detailed redescription. In both of these last two embodiments, the fastener head portions are so inclined, in the initial condition, that an apex is formed at the juncture of the top head sections 26B, 28B, or 26C, 28C, and when the fastener is initially positioned with the legs projecting into an opening in the bottom, it is only necessary to strike or push such apex at the center top head portion to flatten the two head sections in such manner as to spread the legs and cause them to diverge at a substantial angle which causes them to project behind the body panel to secure the fastener in place. In these embodiments also the apex may be forced slightly through center in flattening the top head portions, so that such top head portions assume a slightly concaved character and thereby oppose any tendency to re-bow outwardly in response to outward force exerted upon the ends thereof, such as might result from an effort to pull off a supported molding element or the like secured thereupon in the manner indicated in Fig. 3. The head structure of the embodiment of Figs. 11, 12 and 13 is also preferably centrally weakened as by the formation of the slot 22C at the apex.

The slot 22C is of such length that a shouldered deforming tool 50 resembling a punch and having a reduced tip 52 joined to its enlarged shank by a transverse shoulder 54 may be employed to deform the fastener by thrusting the tip 52 through the slot 22C so that the shoulder 54 bears against the top of the head of the fastener, as shown in Fig. 11, and then forcing the tool inwardly to deform the fastener by the inward pressure exerted upon the apex of the head by the shoulder 54. The tip 52 is of such diameter that as the legs 24C, 25C are spread the tip may pass between them, as shown in Fig. 12.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

I claim:

A headed fastener comprising a head structure formed of an elongated channel having side and bottom webs, tongue-like legs formed out of the bottom web approximately midway of the length of said structure but longitudinally spaced from one another, said side webs being partly severed upon lines in substantial transverse alignment with a part of the bottom web between the points from which said legs project.

WILLIAM R. WILEY.

REFERENCES CITED

The following references are of record in the file of this patent:

UNITED STATES PATENTS

| Number | Name | Date |
|---|---|---|
| 1,491,325 | Thomas | Apr. 22, 1924 |
| 1,873,880 | Hall et al. | Aug. 23, 1932 |
| 1,965,520 | Boden | July 3, 1934 |
| 2,032,315 | Chaffee | Feb. 25, 1936 |
| 2,068,629 | Miller | Jan. 19, 1937 |
| 2,077,604 | Wiley | Apr. 20, 1937 |
| 2,188,026 | Wiley | Jan. 23, 1940 |
| 2,201,335 | Cotter | May 21, 1940 |
| 2,330,675 | Brown | Sept. 28, 1943 |
| 2,353,583 | Place | July 11, 1944 |